United States Patent
Hasegawa

(10) Patent No.: US 8,831,373 B2
(45) Date of Patent: Sep. 9, 2014

(54) OUTPUT DEVICE THAT ADJUSTS IMAGES SHOWN THEREON

(75) Inventor: Tomohiko Hasegawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 658 days.

(21) Appl. No.: 12/817,713

(22) Filed: Jun. 17, 2010

(65) Prior Publication Data

US 2011/0002556 A1    Jan. 6, 2011

(30) Foreign Application Priority Data

Jul. 2, 2009   (JP) .................................. 2009-158008

(51) Int. Cl.
*G06K 9/40*   (2006.01)

(52) U.S. Cl.
USPC ............ 382/274; 382/254; 382/260; 382/275

(58) Field of Classification Search
USPC .................................. 382/254, 260, 274, 276
See application file for complete search history.

(56) References Cited

U.S. PATENT DOCUMENTS

| | | | |
|---|---|---|---|
| 5,404,316 A | 4/1995 | Klingler et al. | |
| 5,689,610 A | 11/1997 | Manico et al. | |
| 5,706,097 A | 1/1998 | Schelling et al. | |
| 5,963,204 A | 10/1999 | Ikeda et al. | |
| 6,028,603 A | 2/2000 | Wang et al. | |
| 6,453,078 B2 | 9/2002 | Bubie et al. | |
| 6,456,391 B1 | 9/2002 | Miyamoto et al. | |
| 6,456,779 B1 | 9/2002 | Saib | |
| 6,657,637 B1 | 12/2003 | Inagaki et al. | |
| 6,701,011 B1 | 3/2004 | Nakajima | |
| 6,795,212 B1 | 9/2004 | Ichikawa | |
| 6,807,361 B1 | 10/2004 | Girgensohn et al. | |
| 6,816,552 B2 | 11/2004 | Demos | |

(Continued)

FOREIGN PATENT DOCUMENTS

| | | |
|---|---|---|
| EP | 1973328 A1 | 9/2008 |
| JP | H01-081574 | 3/1989 |

(Continued)

OTHER PUBLICATIONS

Mei et al., "Video collage: presenting a video sequence using a single image", The Visual Computer 2009, No. 25, pp. 39-51, publisehd online: Aug. 19, 2008.*

(Continued)

*Primary Examiner* — Matthew Bella
*Assistant Examiner* — Jose M Torres
(74) *Attorney, Agent, or Firm* — Scully, Scott, Murphy & Presser PC

(57) ABSTRACT

There is provided an output device including an inputting unit, an extracting unit, a calculating unit, an adjusting unit and an outputting unit. The inputting unit is configured to input an image file representing a motion image. The extracting unit is configured to extract, from the image file, a first frame image and at least one neighboring frame image that is chronologically continuous with the first frame image. The calculating unit is configured to calculate a total adjustment parameter for adjusting the first frame image based on the first frame image and the at least one neighboring frame image. The adjusting unit is configured to adjust the first frame image using the total adjustment parameter to generate a first adjusted output image. The outputting unit is configured to output the first adjusted output image.

18 Claims, 9 Drawing Sheets

(56) References Cited

U.S. PATENT DOCUMENTS

| | | | |
|---|---|---|---|
| 6,902,760 B2 | 6/2005 | Wefringhaus et al. | |
| 6,903,760 B2 | 6/2005 | McFarland et al. | |
| 6,945,716 B2 | 9/2005 | Kawamoto | |
| 7,145,601 B2 | 12/2006 | Misawa et al. | |
| 7,196,727 B2 | 3/2007 | Sato | |
| 7,266,150 B2 | 9/2007 | Demos | |
| 7,277,192 B2 | 10/2007 | Kotani et al. | |
| 7,313,280 B2 | 12/2007 | Murai et al. | |
| 7,447,992 B2 | 11/2008 | Kawabata | |
| 7,495,795 B2 | 2/2009 | Graham et al. | |
| 7,511,846 B2 | 3/2009 | Matsuhira | |
| 7,511,849 B2 | 3/2009 | Matsuhira | |
| 7,540,011 B2 | 5/2009 | Wixson et al. | |
| 7,656,451 B2 | 2/2010 | Yanagi | |
| 7,720,349 B2 | 5/2010 | Ogikubo | |
| 7,760,956 B2 * | 7/2010 | Lin et al. | 382/254 |
| 7,839,512 B2 | 11/2010 | Kotani et al. | |
| 7,911,511 B2 | 3/2011 | Yoshikawa et al. | |
| 7,954,056 B2 | 5/2011 | Graham | |
| 8,094,990 B2 | 1/2012 | Ichikawa | |
| 8,149,286 B2 * | 4/2012 | Takagi et al. | 348/222.1 |
| 8,150,194 B2 * | 4/2012 | Fujibayashi et al. | 382/260 |
| 8,185,842 B2 | 5/2012 | Chang et al. | |
| 8,249,397 B2 | 8/2012 | Wood et al. | |
| 8,311,393 B2 | 11/2012 | Kawaoka | |
| 8,332,757 B1 | 12/2012 | Davey et al. | |
| 2002/0048043 A1 | 4/2002 | Takahashi et al. | |
| 2002/0126318 A1 | 9/2002 | Katayama | |
| 2003/0112871 A1 | 6/2003 | Demos | |
| 2003/0142199 A1 | 7/2003 | McFarland et al. | |
| 2003/0184826 A1 | 10/2003 | Takemoto et al. | |
| 2003/0231862 A1 | 12/2003 | Kawaoka | |
| 2004/0005004 A1 | 1/2004 | Demos | |
| 2004/0226467 A1 | 11/2004 | Underwood et al. | |
| 2004/0247199 A1 | 12/2004 | Murai et al. | |
| 2005/0002063 A1 | 1/2005 | Hanamoto | |
| 2005/0033758 A1 | 2/2005 | Baxter | |
| 2005/0097475 A1 | 5/2005 | Makioka et al. | |
| 2005/0134946 A1 | 6/2005 | Tsue et al. | |
| 2005/0185201 A1 | 8/2005 | Kuwata | |
| 2005/0237588 A1 | 10/2005 | Gohara et al. | |
| 2006/0132637 A1 | 6/2006 | Imanura | |
| 2006/0288304 A1 | 12/2006 | Nomoto et al. | |
| 2007/0003222 A1 | 1/2007 | Shingai | |
| 2007/0053668 A1 | 3/2007 | Misawa et al. | |
| 2007/0146504 A1 | 6/2007 | Morimoto et al. | |
| 2007/0223049 A1 | 9/2007 | Araya et al. | |
| 2007/0258655 A1 * | 11/2007 | Motominami | 382/254 |
| 2007/0285573 A1 | 12/2007 | Ichikawa | |
| 2008/0066016 A1 | 3/2008 | Dowdy et al. | |
| 2008/0088706 A1 | 4/2008 | Girgensohn et al. | |
| 2008/0151317 A1 | 6/2008 | Imine | |
| 2008/0174747 A1 | 7/2008 | Fujinawa | |
| 2008/0231741 A1 | 9/2008 | McIntyre et al. | |
| 2009/0009530 A1 | 1/2009 | Araki et al. | |
| 2009/0080020 A1 | 3/2009 | Kitagawa | |
| 2009/0086044 A1 | 4/2009 | Kinemura | |
| 2009/0116811 A1 | 5/2009 | Kukreja et al. | |
| 2009/0316056 A1 | 12/2009 | Rosencwaig et al. | |

FOREIGN PATENT DOCUMENTS

| | | | |
|---|---|---|---|
| JP | 2000-98514 | | 4/2000 |
| JP | 2001-197445 | | 7/2001 |
| JP | 2003-299001 | | 10/2003 |
| JP | 2004-64231 | | 2/2004 |
| JP | 2004-282377 | A | 10/2004 |
| JP | 2005-130254 | | 5/2005 |
| JP | 2005-160020 | A | 6/2005 |
| JP | 2006-011754 | | 1/2006 |
| JP | 2006-513592 | A | 4/2006 |
| JP | 2007-110224 | | 4/2007 |
| JP | 2007-221301 | | 8/2007 |
| JP | 2007-266862 | | 10/2007 |
| JP | 2008-022482 | | 1/2008 |
| JP | 4081736 | | 2/2008 |
| JP | 2008-80522 | | 4/2008 |
| JP | 2008-271594 | A | 11/2008 |

OTHER PUBLICATIONS

Extended European Search Report dated Nov. 5, 2010 in corresponding European Patent Application No. 09014747.

Japanese Official Action mailed Dec. 7, 2010 in corresponding Japanese Patent Application No. 2008-304804 of related U.S. Appl. No. 12/626,176, together with an English language translation.

Office Action dated Mar. 6, 2012 received in a related U.S. Appl. No. 12/626,165.

Office Action dated Mar. 12, 2012 received in a related U.S. Appl. No. 12/626,184.

Abstract of Japanese Patent Publication No. 2001-078127, dated Mar. 23, 2001.

David Kappos, Subject Matter Eligibility of Computer Readable Media, Feb. 23, 2010, US Patent and Trademark Office, 1351 OG 212.

U.S. Office Action dated Aug. 17, 2012, received in related U.S. Appl. No. 12/626,176.

U.S. Final Office Action dated Sep. 7, 2012, received in related U.S. Appl. No. 12/626,165.

U.S. Final Office Action dated Sep. 13, 2012, received in related U.S. Appl. No. 12/626,184.

Japanese Official Action dated Jul. 27, 2010 with English translation.

Chinese Official Action mailed Aug. 31, 2011 in corresponding Chinese Patent Application No. 200910225847.9 of related U.S. Appl. No. 12/626,184, together with an English language translation.

Japanese Official Action dated Sep. 7, 2010 with English translation.

U.S. Official Action dated Apr. 10, 2013 from related U.S. Appl. No. 12/626,176, filed Nov. 25, 2009.

Japanese Office Action dated May 7, 2013 issued in JP 2009-158008 filed Apr. 22, 2013.

Japanese Office Action dated Feb. 5, 2013 issued in related Japanese Patent Application 2009-158008.

US Office Action dated Jun. 7, 2013 from related U.S. Appl. No. 12/626,184, filed Nov. 25, 2009.

European Official Action dated Mar. 4, 2013 from related European Patent Application 09014747.1.

Notice of Allowance dated Sep. 25, 2013 from related U.S. Appl. No. 12/626,176.

U.S. Office Action dated Oct. 1, 2013 from related U.S. Appl. No. 12/626,165.

U.S. Office Action dated Oct. 30, 2013 received in related case, namely, U.S. Appl. No. 12/626,184.

United States Office Action dated Mar. 21, 2014 issued in related case U.S. Appl. No. 12/626,184.

United States Office Action dated Mar. 7, 2014 issued in related case U.S. Appl. No. 12/626,165.

* cited by examiner

FIG. 4

| 51 | 52 | 53 |
|---|---|---|
| 0 | "IMG01.jpg" | 2885 |
| 1 | "IMG02.avi" | 18000 |
| 2 | "IMG03.mov" | 58763 |
| 3 | "IMG04.jpg" | 4381 |

| | |
|---|---|
| 0 | 61 |
| 1 | 62 |
| 640 | 63 |
| 480 | 64 |
| 1280 | 65 |
| 30 | 66 |

| 91 | | | | |
|---|---|---|---|---|
| | | 5 | | |
| 0 | 160 | 7520000 | 38900 | XXX |
| 1 | 159 | 7514000 | 38500 | XXX |
| 2 | 161 | 7526000 | 39200 | XXX |
| 3 | 158 | 7508000 | 38700 | XXX |
| 4 | 162 | 7532000 | 39000 | XXX |

92  93  94  95  96 — 42

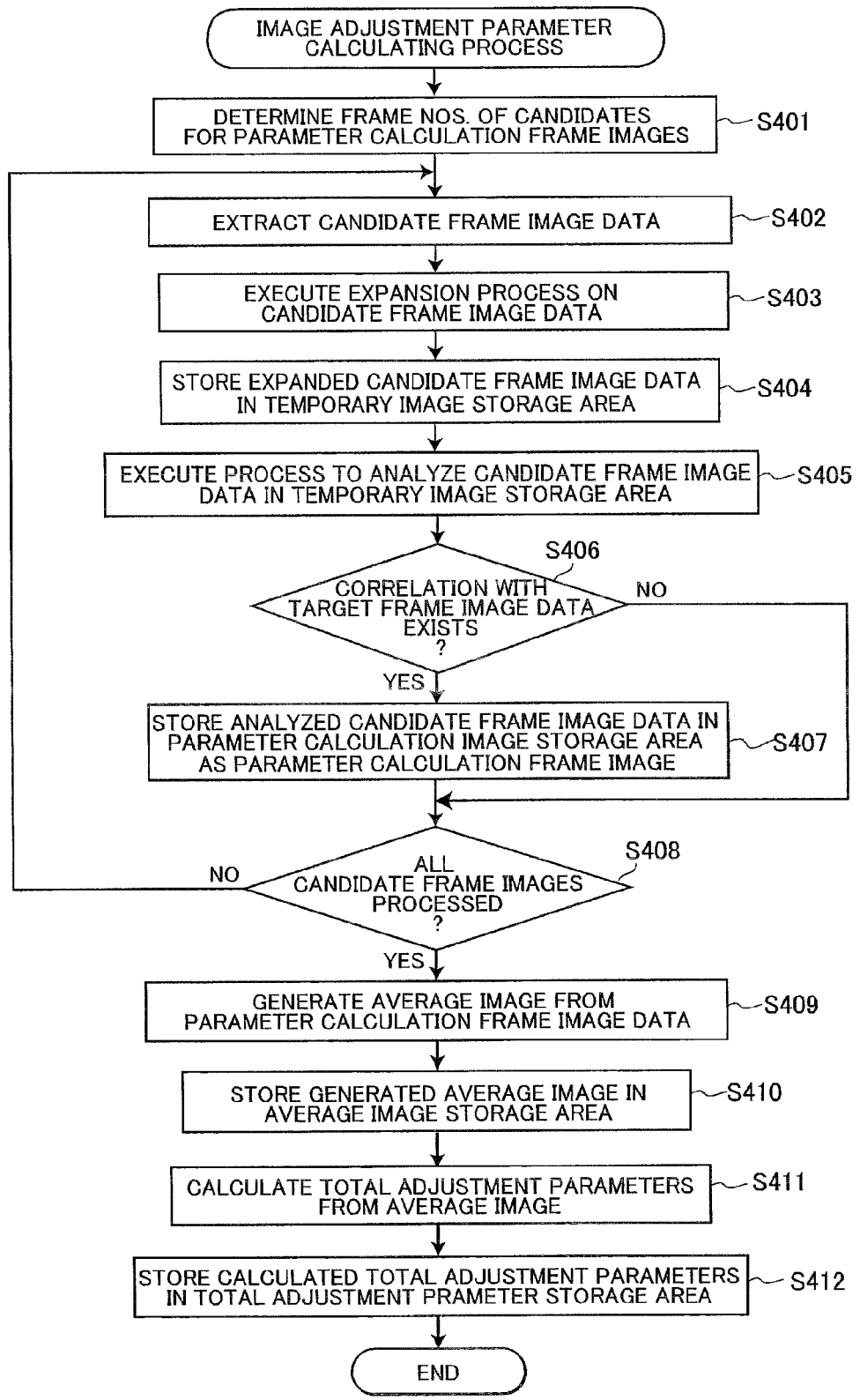

OUTPUT DEVICE THAT ADJUSTS IMAGES SHOWN THEREON

CROSS REFERENCE TO RELATED APPLICATION

This application claims priority from Japanese Patent Application No. 2009-158008 filed Jul. 2, 2009. The entire content of the priority application is incorporated herein by reference.

TECHNICAL FIELD

The present invention relates to an output device for outputting images represented by an image file.

BACKGROUND

A conventional printing device well known in the art reads image files representing photographs or other still images (still image files) from a storage medium, and prints out the still images represented by the image files. Recently, there have also been proposals for printing devices capable of printing out not only images for still image files, but also images for image files representing motion images (motion image files).

Such a conventional printing device is configured to be able to print a plurality of frame images extracted from a motion image file in an arrangement on a single page, for example, as disclosed in Japanese Unexamined Patent Application No. 2005-130254. This printing device is also configured to perform adjustments on the frame images extracted from the motion image file. A user can adjust color balance and brightness, while visually confirming adjustment states shown on a preview screen.

SUMMARY

A user without expertise often finds difficulty in performing adjustments appropriately. Further, frame images extracted from a motion image file may contain noise contents therein.

In view of the foregoing, it is an object of the present invention to provide an improved output device that can mitigate effects of noise contents contained in frame images while appropriately adjusting the frame images.

In order to attain the above and other objects, there is provided an output device including an inputting unit, an extracting unit, a calculating unit, an adjusting unit and an outputting unit. The inputting unit is configured to input an image file representing a motion image. The extracting unit is configured to extract, from the image file, a first frame image and at least one neighboring frame image that is chronologically continuous with the first frame image. The calculating unit is configured to calculate a total adjustment parameter for adjusting the first frame image based on the first frame image and the at least one neighboring frame image. The adjusting unit is configured to adjust the first frame image using the total adjustment parameter to generate a first adjusted output image. The outputting unit is configured to output the first adjusted output image.

According to another aspect of the present invention, there is provided an output device including an inputting unit, a processor, and an outputting unit. The inputting unit is configured to input an image file representing a motion image. The processor is configured to: extract, from the image file, a first frame image and at least one neighboring frame image that is chronologically continuous with the first frame image; calculate a total adjustment parameter for adjusting the first frame image based on the first frame image and the at least one neighboring frame image; and adjust the first frame image using the total adjustment parameter to generate a first adjusted output image. The outputting unit is configured to output the first adjusted output image.

According to still another aspect of the present invention, there is provided a non-transitory storage medium storing a set of program instructions executable on an output device. The set of program instructions includes: inputting an image file representing a motion image; extracting, from the image file, a first frame image and at least one neighboring frame image that is chronologically continuous with the first frame image; calculating a total adjustment parameter for adjusting the first frame image based on the first frame image and the at least one neighboring frame image; adjusting the first frame image using the total adjustment parameter to generate a first adjusted output image; and outputting the first adjusted output image.

BRIEF DESCRIPTION OF THE DRAWINGS

In the drawings:

FIG. 4 is a view conceptually illustrating an input image data storage area of the RAM;

FIG. 5 is a view conceptually illustrating a motion image data storage area of the RAM;

FIG. 12 is a flowchart of an image adjustment parameter calculating process according to a second embodiment.

DETAILED DESCRIPTION

Figure 1:
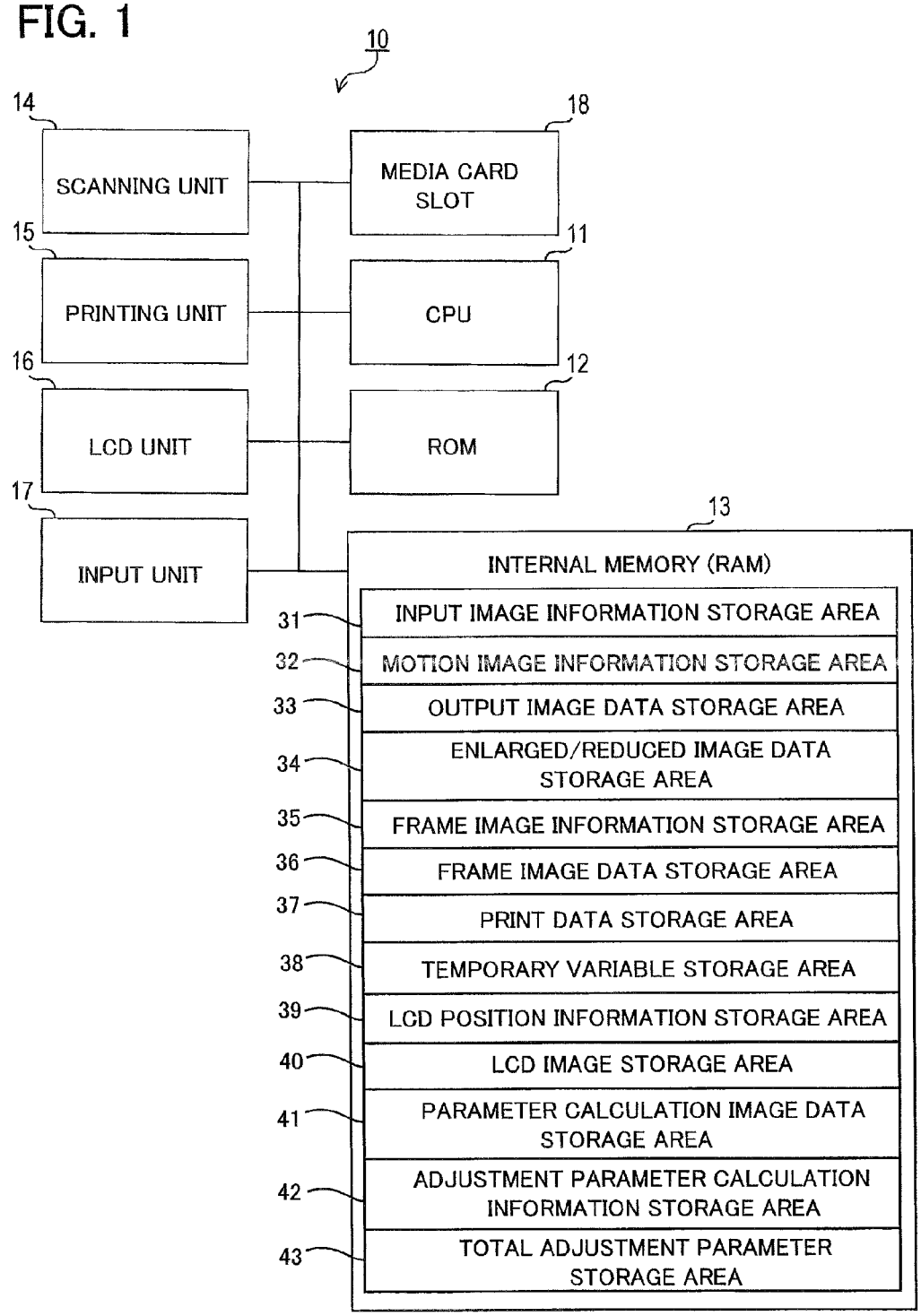
FIG. 1 is a block diagram illustrating an electrical configuration of a multifunctional peripheral (MFP) according to a first embodiment of the present invention, the MFP including a CPU, an LCD unit and an internal memory (RAM)

First, a general configuration of a multifunctional peripheral 10 (hereinafter to be referred to as the "MFP 10") according to a first embodiment of the present invention will be described with reference to FIG. 1.

The MFP 10 is provided with various functions, including a printer function, a scanner function, and a color copier function. As shown in FIG. 1, the MFP 10 includes a CPU 11, a ROM 12, an internal memory (RAM) 13, a scanning unit 14, a printing unit 15, an LCD unit 16, an input unit 17 and a media card slot 18 that are interconnected with one another by signal lines.

The CPU 11 performs all computations for the MFP 10. The ROM 12 has prestored programs that the CPU 11 executes in order to implement processes described later. The RAM 13 temporarily stores results of computations performed by the CPU 11, inputted data, and the like. Details of the RAM 13 will be also described later.

The printing unit 15 prints image data to which a print command has been issued. The printing unit 15 can print images using toner or ink of four colors of C, M Y and K. The LCD unit 16 displays images (including images of character strings for messages) on a compact color liquid crystal display.

The input unit 17 has various operating keys that a user can press, and inputs data based on the pressed keys. More specifically, the input unit 17 includes an Up key, a Down key, a Left key, and a Right key for moving a cursor up, down, left, and right; and an OK key for accepting a selection (all not shown).

The media card slot 18 receives a media card inserted thereinto, such as an SD card and a CompactFlash card (portable, non-volatile storage media). The MFP 10 also has a direct print function for directly reading image files from a media card inserted in the media card slot 18 and printing images represented by the image files stored in the media card.

The image files discussed herein include both still image files representing still images, and motion image files representing motion images and configured of a plurality of frame images. When the image file to be outputted is a still image file, the MFP 10 outputs the still image represented by the still image file on a single page. When the image file to be outputted is a motion image file, the MFP 10 extracts a prescribed number (nine in the present embodiment) of frame images from the plurality of frame images constituting the motion image represented by the motion image file, and outputs an image having the extracted frame images laid out on a single page in chronological order (to be referred to as a "layout image" hereinafter; see FIG. 2).

In the present embodiment, the MFP 10 automatically identifies nine frame images, including the first image (the first frame), the last image (the last frame), and seven images (seven frames) distributed equally therebetween, by dividing the total number of frames in the motion image file in eight equal intervals. Note that the seven images may be obtained by dividing the total number of frames into eight approximately equal intervals if the total number of frames cannot be divided into exactly the same amounts of eight divisions. The extracted nine frame images are thus discontinuous from one another chronologically, unless the motion image file originally includes a drastically small number of frames in total. Rather than referencing the total number of frames, the motion image file may be divided into eight equal time intervals by referencing the playback time of the motion image, for example.

The MFP 10 according to the present embodiment performs adjustments on frame images to be outputted for each image file. Conceivably, adjustment parameters used for adjusting images are calculated based on the frame images that are subject to adjustment (i.e., target for output). However, frame images extracted from a motion image file may possibly include noise contents resulting from an imaging device. In such a case, the noise contents may adversely affect calculation of the adjustment parameters, and as a result, appropriate adjustment parameters would not be obtained.

Figure 2:
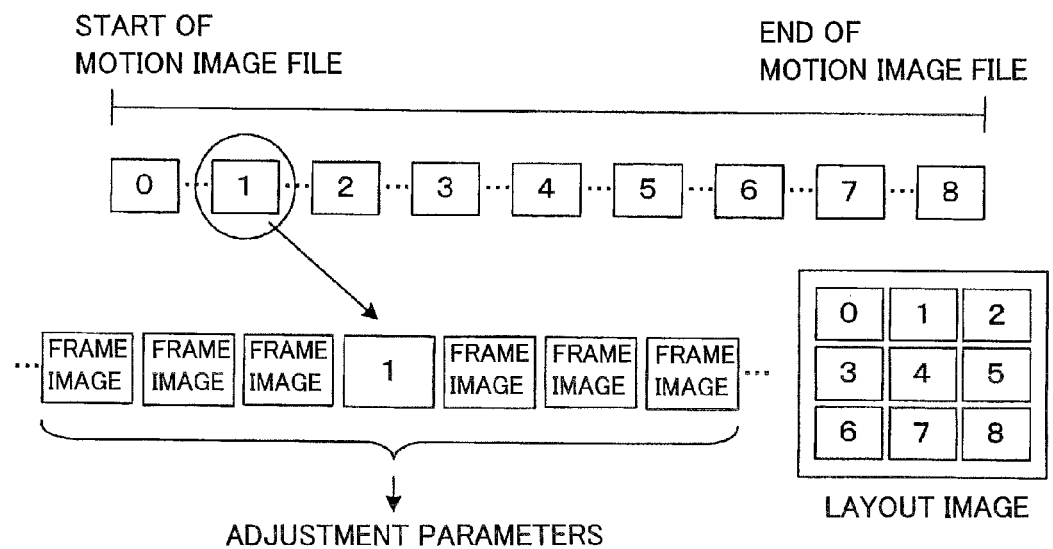
FIG. 2 is an overview explaining an example of a method to calculate adjustment parameters according to the first embodiment.

Therefore, in the MFP 10 of the present embodiment, the adjustment parameters used for adjusting each frame image are calculated based not only on the frame image that is target for adjustment (target for output), but also on a prescribed number of frame images that are chronologically continuous with the target frame image (to be referred to as "neighboring frame images"). More specifically, as shown in FIG. 2, the MFP 10 extracts nine frame images, which are chronologically discontinuous from one another, from a motion image file as an output target. When performing image adjustment on each of these frame images, the MFP 10 calculates adjustment parameters, for each image adjustment, based on the frame image (the output target) as well as on the prescribed number of neighboring frame images continuous with the target frame image (three neighboring frame images before as well as after the target frame image in case of FIG. 2). The neighboring frame images are normally configured of frame images that will not be outputted. However, if a total number of frame images that can be extracted from a motion image file is very small, the neighboring frame images may include other frame images that are target for output.

Figure 3A:
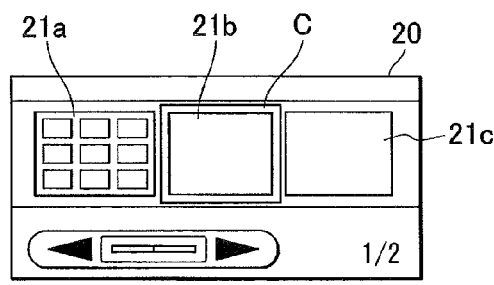
FIG. 3A is a view showing an example of a first page of a selection screen shown on the LCD unit of the MFP according to the first embodiment.
Figure 3B:
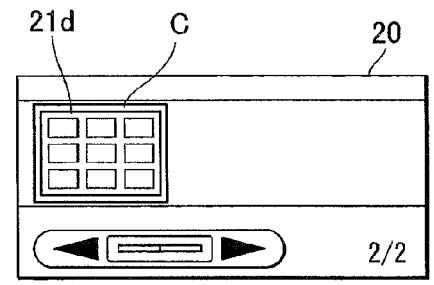
FIG. 3B is a view showing an example of a second page of the selection screen according to the first embodiment.

The MFP 10 displays a selection screen 20 such as that shown in FIGS. 3A and 3B on the LCD unit 16, enabling the user to select an image file to be printed from among the plurality of image files stored on the media card, and prints an image represented by the selected image file. More specifically, the MFP 10 displays thumbnail images representing output images for all of the image files that are candidates for printing in the selection screen 20, from which thumbnail images the user can tell what the output images will look like when the output images for the image files are actually printed. In other words, if the image file is a still image file, the MFP 10 displays, as the thumbnail image, a still image representing the still image file on a single page. If the image file is a motion image file, the MFP 10 displays a predetermined number of frame images (nine in the present embodiment) laid out on a single page as the thumbnail image.

Next, storage areas of the RAM 13 will be described with reference to FIGS. 1 through 8.

As shown in FIG. 1, the RAM 13 is provided with various storage areas for storing different types of data. The storage areas include an input image information storage area 31, a motion image information storage area 32, an output image data storage area 33, an enlarged/reduced image data storage area 34, a frame image information storage area 35, a frame image data storage area 36, a print data storage area 37, a temporary variable storage area 38, an LCD position information storage area 39, an LCD image storage area 40, a parameter calculation image data storage area 41, an adjustment parameter calculation information storage area 42 and a total adjustment parameter storage area 43.

The input image information storage area 31 serves to store data on image files stored on a media card inserted in the media cart slot 18. As shown in FIG. 4, the input image information storage area 31 is divided into an input image ID storage area 51, an input image filename storage area 52, and an input image file size storage area 53.

The input image ID storage area 51 serves to store IDs for image files stored on the media card. The IDs are assigned sequentially beginning from 0 based on the number of image files (hereinafter referred to as "input image IDs"). The input image IDs are assigned to the image files in the order that the files are read from the media card.

The input image filename storage area 52 serves to store filenames of the image files stored on a media card. The input image file size storage area 53 serves to store numerical values (values in units of kilobytes in this example) indicating the file sizes of the image files.

The motion image information storage area 32 serves to temporarily store data read from the media card for a motion image file being processed. Specifically, as shown in FIG. 5, the motion image information storage area 32 is provided with a format type storage area 61, a codec type storage area 62, a horizontal size storage area 63, a vertical size storage area 64, a total frame number storage area 65 and an FPS data storage area 66.

The format type storage area 61 stores data of a type of file format for the motion image file being processed. In the present embodiment, the format type storage area 61 may store one of the values that have been preassigned to one of three file formats: 0 for AVI format, 1 for MOV format and 2 for MPEG format.

The codec type storage area 62 stores data of a type of codec for the motion image file being processed. In the present embodiment, the codec type storage area 62 may store one of the values 0, 1 or 2 that have been preassigned to one of three types of codecs: 0 for MotionJPEG codec, 1 for MPEG1 codec and 2 for DivX codec.

The horizontal size storage area 63 stores numerical data indicating the number of pixels in the horizontal direction in each frame image constituting the motion image file (frame image) being processed.

The vertical size storage area 64 stores numerical data indicating the number of pixels in the vertical direction in each frame image constituting the motion image file (frame image) being processed.

The total frame number storage area 65 stores numerical data indicating a total number of frame images (number of frames) constituting the motion image file being processed.

The FPS data storage area 66 stores numerical data indicating an FPS (Frames Per Second) for the motion image file being processed. The FPS indicates how many number of frames are played back per one second in the motion image file.

The output image data storage area 33 serves to temporarily store output image data (image data representing print images). For a motion image file, the output image is a layout image in which nine frame images extracted from the motion image file are sequentially laid out on a single page. For a still image file, the output image is one still image, which is represented by the still image file, laid out on a single page.

The enlarged/reduced image data storage area 34 serves to store enlarged/reduced image data generated by converting (expanding or reducing) the output image data to a predetermined thumbnail image size.

Figure 6:
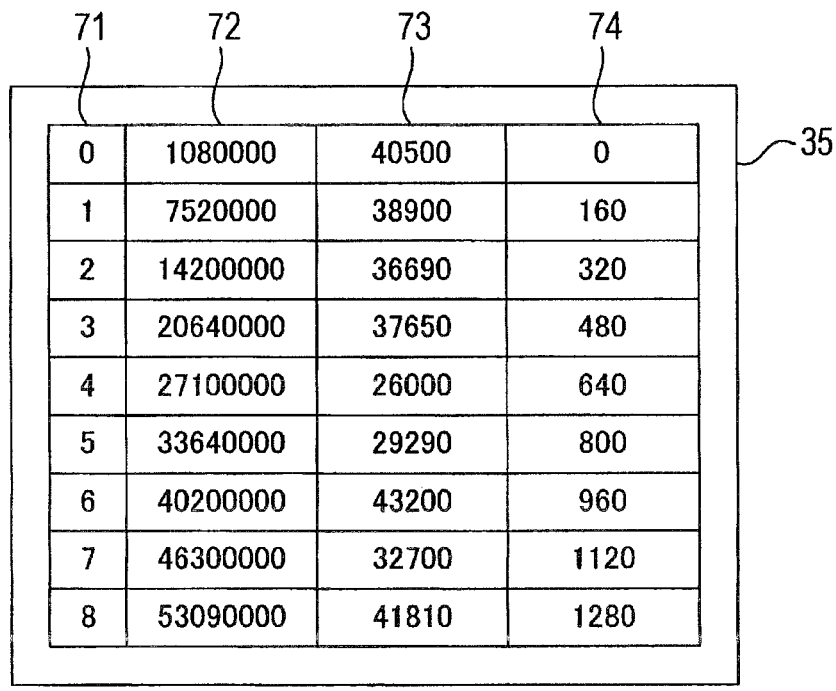
FIG. 6 is a view conceptually illustrating a frame image data storage area of the RAM.

The frame image information storage area 35 serves to store information on frame images extracted from a motion image file to be laid out in a layout image. Specifically, as shown in FIG. 6, the frame image information storage area 35 is provided with a frame layout position no. storage area 71, an offset size data storage area 72, a frame size data storage area 73 and a frame no. storage area 74.

The frame layout position no. storage area 71 serves to store one of the numbers 0 through 8 that have been preassigned to each layout position in the layout image at which each of the nine frame images is laid out (to be referred to as a "layout position no."). Specifically, as shown in FIG. 2, the layout image is a matrix configured of three rows and three columns. Each layout position at which one of the nine frame images is laid out is assigned with 0, 1, 2 from left to right in the first row, 3, 4, 5 from left to right in the second row, and 6, 7, 8 from left to right in the third row.

The offset size data storage area 72 serves to store numerical data identifying where each of nine frame images extracted from the motion image file is positioned within the motion image file. More specifically, the offset size data storage area 72 stores numerical values (values in units of bytes in this example) indicating an amount of offset from the beginning of the motion image file to the start of data for each frame image. A motion image file is configured of frame image data arranged sequentially between header data at the beginning of the file and index data at the end of the file. Thus, the amount of offset is a value indicating the size of data from the beginning of the motion image file (the start of the header data in this case) to the start of frame image data targeted for extraction. The amount of offset is stored in units of bytes rather than kilobytes in order to accurately identify the position from which each target frame image data starts.

The frame size data storage area 73 serves to store data sizes of the frame image data for the extracted nine frame images (in a compressed format, such as JPEG format). The data size of the frame image data is stored in a numerical value (a value in units of bytes in the present embodiment).

The frame no. storage area 74 serves to store numerical data indicating where each frame image is located within a motion image file represented by the frame images (frame nos.). The first frame of the motion image file is assigned with 0.

The frame image data storage area 36 serves to temporarily store a frame image extracted from a motion image file. The frame image data stored in this region is in a compressed state and has not yet been expanded (decoded).

The print data storage area 37 serves to temporarily store print data for actual printing that has been produced by converting the output image data.

The temporary variable storage area 38 serves to temporarily store variables and counters, such as a page no. counter, a cursor position counter, a processing page no. variable, a generated image counter, a processed frame image counter and a calculation frame image counter. These variable and counters are used during various processes executed by the CPU 11, as will be described later.

Figure 7:
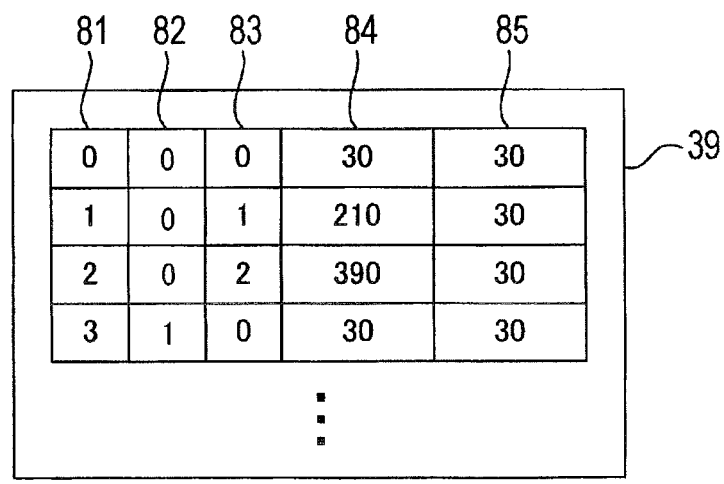
FIG. 7 is a view conceptually illustrating an LCD position data storage area of the RAM in the MFP according to the first embodiment.

The LCD position information storage area 39 serves to store data indicating a display position and a display page (described later) of the selection screen 20 at which each thumbnail image is to be positioned. As shown in FIG. 7, the LCD position information storage area 39 is provided with an input image ID storage area 81, a display page no. storage area 82, a display image position number storage area 83, a horizontal display coordinate storage area 84 and a vertical display coordinate storage area 85.

The input image ID storage area 81 stores input image IDs for the image files, which correspond to the input image IDs stored in the input image ID storage area 51 of the input image information storage area 31.

The display page no. storage area 82 stores, for each input image ID, a page number of the selection screen 20 on which the thumbnail image for the corresponding image file should be displayed. Since there is a limit to the number of thumbnail images that can be displayed simultaneously in the selection screen 20 on the LCD unit 16 (three in the present embodiment), the user must switch among a plurality of pages of the selection screen 20 when the number of selectable image files exceeds this limit. For example, assume that four image files are stored on the media card and are assigned with input image IDs of 0, 1, 2 and 3. In this case, thumbnail images 21a, 21b and 21c for the image files having IDs of 0-2 are displayed on a first page of the selection screen 20 respectively at a left position ($0^{th}$ display position), a center position ($1^{st}$ display position), and a right position ($2^{nd}$ display position), as shown in FIG. 3A, and the remaining thumbnail image 21d for the image file having ID of 3 is displayed at the left position on a second page, as shown in FIG. 3B.

The display image position number storage area 83 stores one of the numbers 0, 1, and 2 to indicate the position at which each thumbnail image is displayed in the selection screen 20 (i.e., display positions $0^{th}$, $1^{st}$, or $2^{nd}$ from the left).

The horizontal display coordinate storage area 84 stores data for a horizontal image layout starting point indicating a horizontal starting point at which each thumbnail image is to be displayed in the selection screen 20 on the LCD unit 16

The vertical display coordinate storage area 85 stores data for a vertical image layout starting point indicating a vertical starting point at which each thumbnail image is to be displayed in the selection screen 20 on the LCD unit 16. The data on the horizontal and vertical image layout stating points of respective display positions are predetermined for the LCD unit 16. Therefore, each thumbnail image is to be displayed at a fixed display position selected among the $0^{th}$ to $2^{nd}$ display positions.

The LCD image storage area 40 serves to store thumbnail images to be displayed simultaneously in the selection screen 20 on the LCD unit 16. Specifically, the LCD image storage area 40 has three sub-regions for storing thumbnail images, each sub-region being assigned one of the display position numbers $0^{th}$, $1^{st}$, and $2^{nd}$ that correspond to the numbers 0, 1 and 2 stored in the display image position number storage area 83 of the LCD position information storage area 39.

The parameter calculation image data storage area 41 serves to store frame image data for one frame image, based on which adjustment parameters are to be calculated (to be referred to as a "parameter calculation frame image"). In the first embodiment, the parameter calculation image data storage area 41 is provided with one sub-region in which frame image data for one parameter calculation frame image can be stored.

Figures 8, 13:
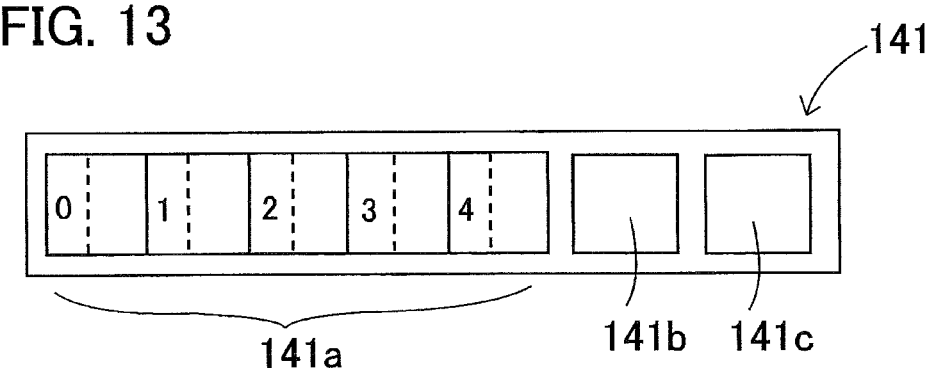
FIG. 8 is a view conceptually illustrating an adjustment parameter calculation data storage area of the RAM.
FIG. 13 is a view conceptually illustrating a parameter calculation image data storage area according to the second embodiment.

The adjustment parameter calculation information storage area 42 serves to store various information used for calculating adjustment parameters. More specifically, as shown in FIG. 8, the adjustment parameter calculation information storage area 42 is provided with a candidate frame number storage area 91, a parameter calculation frame ID storage area 92, a parameter calculation frame no. storage area 93, an offset size storage area 94, a frame data size storage area 95 and an adjustment parameter storage area 96.

The candidate frame number storage area 91 stores a numerical value indicating how many frame images should be selected as candidate for the parameter calculation frame image (to be referred to as "candidate frame number").

The parameter calculation frame ID storage area 92 stores IDs that are assigned to a plurality of sub-regions each storing data for a parameter calculation frame image (to be referred to as "parameter calculation frame IDs"). The parameter calculation frame IDs are sequentially assigned from 0 up to a number corresponding to the candidate frame number −1. In case of an example of FIG. 8, since the candidate frame number is 5, the parameter calculation frame ID storage area 92 has five sub-regions that are assigned with 0, 1, 2, 3 and 4 respectively.

The parameter calculation frame no. storage area 93 stores numerical values indicating where each parameter calculation frame image is positioned chronologically in the original motion image file, i.e., what number frame image each parameter calculation frame image is (frame no. of each parameter calculation frame image). The parameter calculation frame no. storage area 93 has a plurality of sub-regions in correspondence with the parameter calculation frame IDs of the parameter calculation frame ID storage area 92.

The offset size storage area 94 stores the offset sizes of the respective parameter calculation frame images.

The frame data size storage area 95 stores data sizes of the respective parameter calculation frame images (data size in a compressed format before expansion).

The adjustment parameter storage area 96 stores adjustment parameters calculated from each parameter calculation frame image whenever available. If adjustment parameters are not calculated for a certain parameter calculation frame image, a sub-region corresponding to this parameter calculation frame image is left blank, as will be described later. The offset size storage area 94, the frame data size storage area 95 and the adjustment parameter storage area 96 are respectively provided with a plurality of sub-regions in correspondence with the parameter calculation frame IDs of the parameter calculation frame ID storage area 92.

The total adjustment parameter storage area 43 serves to store total adjustment parameters that are calculated from the adjustment parameters stored in the adjustment parameter storage area 96. The total adjustment parameters are used for making adjustments on the frame image stored in the frame image data storage area 36 as a target for adjustment, as will be described later.

Figure 9:
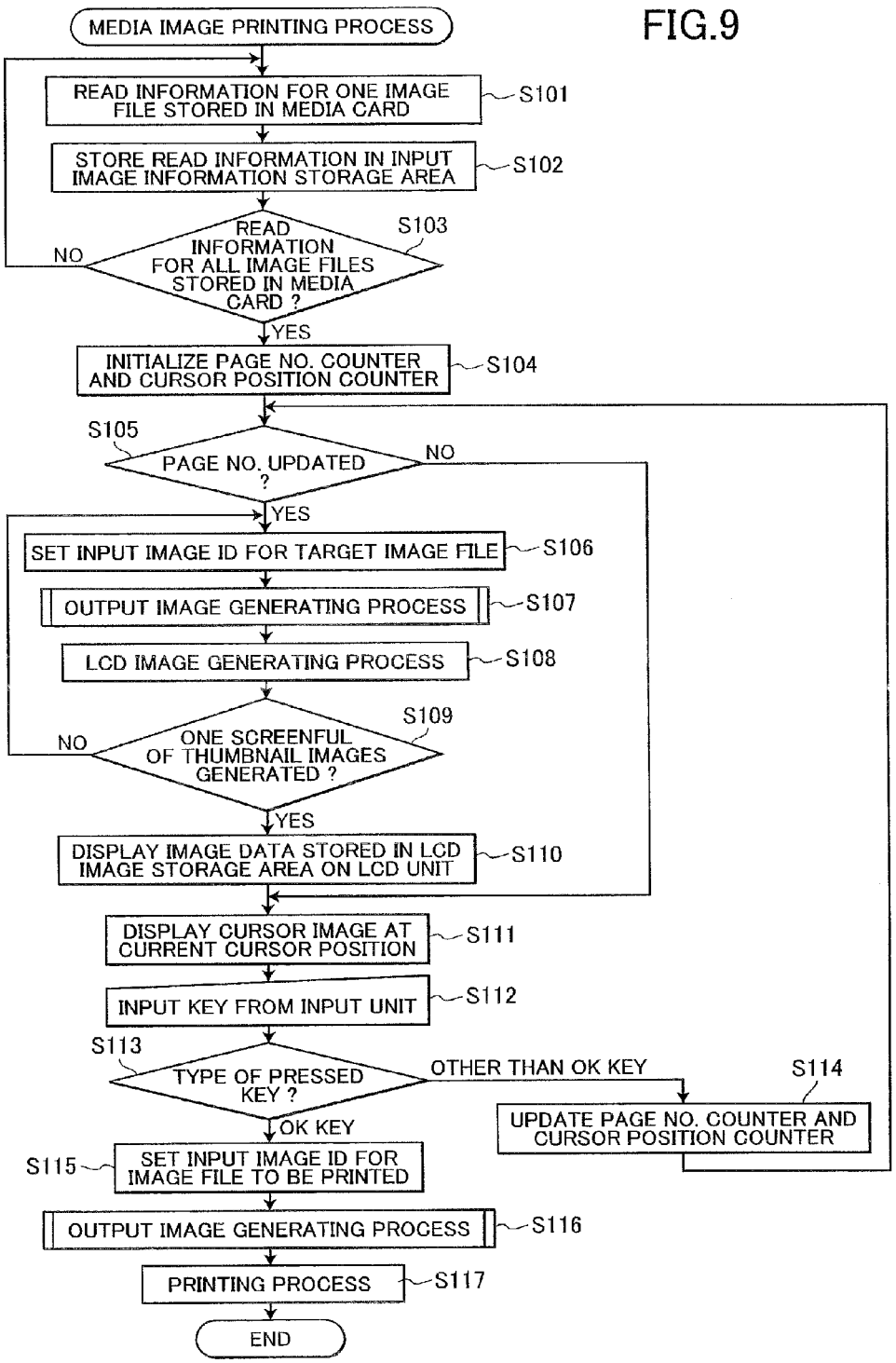
FIG. 9 is a flowchart of a media image printing process executed by the CPU of the MFP according to the first embodiment.
Figure 10:
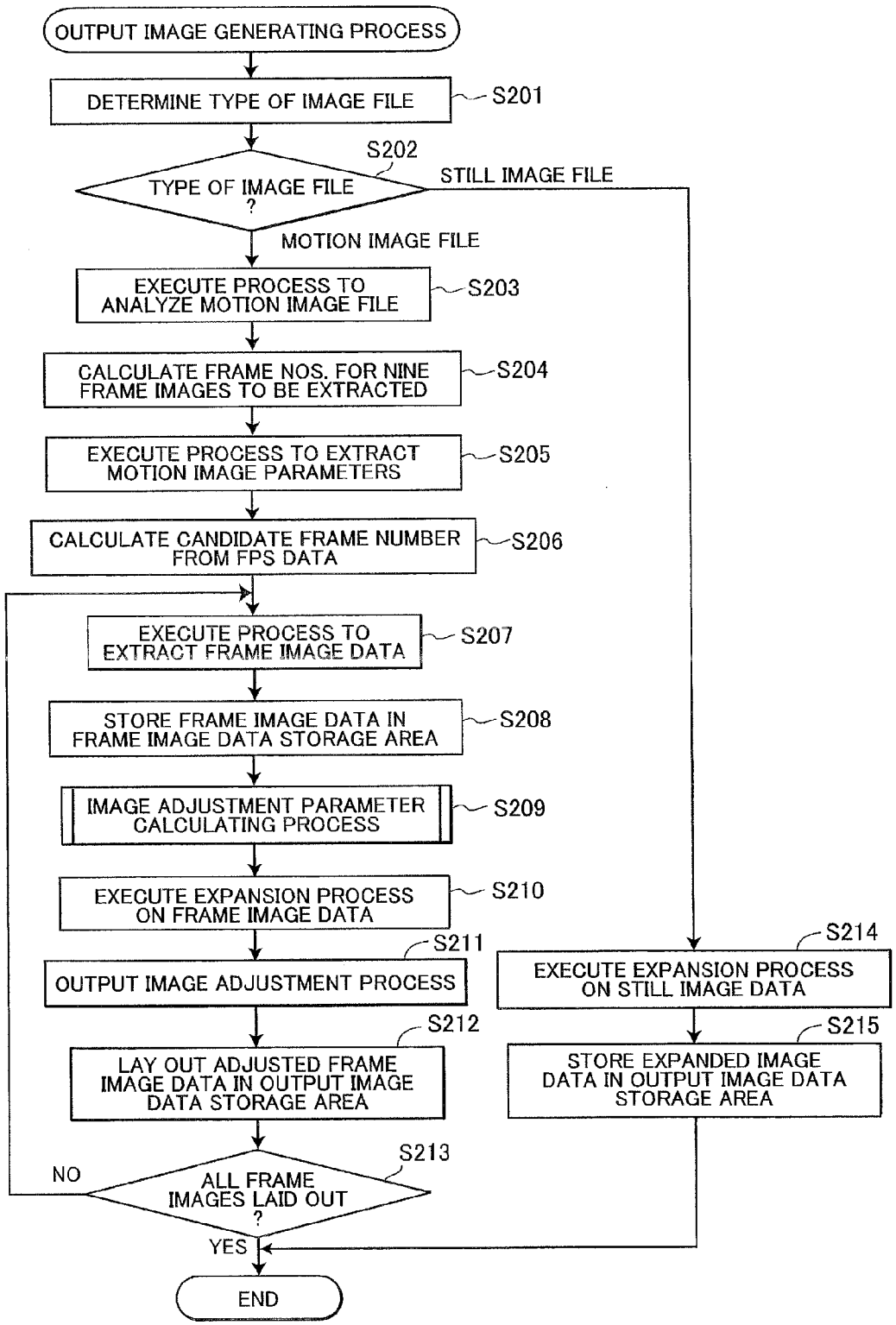
FIG. 10 is a flowchart of an output image generating process executed by the CPU during the media image printing process of FIG. 9.

Next, processes according to the first embodiment executed by the CPU 11 of the MFP 10 will be described in detail with reference to FIGS. 9 through 11.

The CPU 11 of the MFP 10 performs the following processes (1)-(3):
(1) a media image printing process;
(2) an output image generating process; and
(3) an image adjustment parameter calculating process.

The CPU 11 executes the media image printing process (process (1) described above) when the user performs an operation on the input unit 17 to select a 'media image printing mode' while a media card storing image files is inserted in the media card slot 18. The other processes (2)-(3) are executed as subroutines called during the media image printing process.

First, the media image printing process executed by the CPU 11 will be described while referring to a flowchart in FIG. 9.

In S101 at the beginning of this media image printing process, the CPU 11 reads information (a filename and file size) for one image file stored in the media card.

In S102 the CPU 11 stores the information read in S101 in the input image information storage area 31 in association with one input image ID. The CPU 11 further stores the input image ID, display page and position data for the subject image file (data of a display page and a display position at which a thumbnail image for the subject image file should be displayed) in the input image ID storage area 81, the display page no. storage area 82, the display image position number storage area 83, the horizontal display coordinate storage area 84 and the vertical display coordinate storage area 85 in the LCD position information storage area 39.

In S103 the CPU 11 determines whether information for all image files stored in the media card has been read.

If the CPU 11 determines in S103 that information for all image files has not been read (S103: NO), the CPU 11 returns to S101 and reads information for one of the remaining image files.

However, if information has been read for all image files (S103: YES), in S104 the CPU 11 initializes both of the page no. counter and the cursor position counter (prestored in the temporary variable storage area 38) to 0. The page no. counter represents a page no. on which a cursor image C (see FIGS. 3A and 3B) is currently being located among all the pages available in the selection screen 20. The cursor position counter represents the position at which the cursor image C is currently being located among the three thumbnail images simultaneously displayed on one page of the selection screen 20. The page no. counter and the cursor position counter are interlocked with the user's operations of the Up, Down, Left and Right keys on the input unit 17.

In S105 the CPU 11 determines whether the page no. of the selection screen 20 has been updated. Specifically, the processing page no. variable is prestored in the temporary variable storage area 38 for representing a page no. on which an image file currently being processed is located among all the pages available in the selection screen 20. The processing page no. variable is given an initial value of −1. The CPU 11 determines whether the page no. of the selection screen 20 has been updated by the user by comparing the value of the processing page no. variable with the value of the page no. counter, and judges that the page no. has been updated by the user when the two values are different. The processing page no. variable has been set to an initial value of −1 to ensure that the CPU 11 makes a YES determination the first time S105 is performed. After reaching a YES determination in S105, before executing the process of S106, the processing page no. variable is updated to match the value of the page no. counter.

When the CPU 11 determines that the values of the processing page no. variable and the page no. counter are different from each other, i.e., the CPU 11 determines that the page no. was updated by the user (S105: YES), in S106 the CPU 11 sets the input image ID of an image file to be processed (target image file). Specifically, the generated image counter is prestored in the temporary variable storage area 38 for counting how many thumbnail images have been generated for being displayed on one page of the selection screen 20. The CPU 11 sets the input image ID for the target image file to the input image ID that is stored in the input image ID storage area 81 in association with a combination of the value in the display page no. storage area 82 that is equal to the value of the page no. counter (page no.) and the value in the display image position number storage area 83 that is equal to the value of the generated image counter (display position). The value stored in the generated image counter is always reset to 0 when the CPU 11 advances from S105 to S106.

In S107 the CPU 11 executes the output image generating process (process (2) described above) on the target image file whose input ID has been set in S106. In S107, the CPU 11 generates output image data for the target image file (image data representing a print image) in the output image data storage area 33. Details of the output image generating process will be described later with reference to FIG. 10.

In S108 the CPU 11 executes an LCD image generating process on the output image data stored in the output image data storage area 33 to generate a thumbnail image for the target image file. Specifically, in the LCD image generation process, the output image data is enlarged or reduced to a predetermined size to generate a thumbnail image, and the thumbnail image is then stored in the enlarged/reduced image data storage area 34. Subsequently, the thumbnail image is copied to one of the three sub-regions within the LCD image storage area 40 in association with a display position number that is equal to the current value of the generated image counter.

In S109 the CPU 11 determines whether one screenful of thumbnail images has been generated. The CPU 11 increments the generated image counter by 1 upon determining in S109 that one screenful of thumbnail images has not yet been generated (S109: NO) and returns to S106 to generate another thumbnail image.

Specifically, in S109 the CPU 11 determines whether one screenful of thumbnail images has been generated based on whether the value of the generated image counter has reached the maximum number of thumbnail images that can be displayed in one screen (since three thumbnail images can be displayed simultaneously in the selection screen 20 in the present embodiment, the maximum image number is set to 2 because the initial value of the generated image counter is 0).

If there are less than three thumbnail images to be displayed on the last page of the selection screen 20, the CPU 11 determines that one screenful of thumbnail images has been generated by referring to the input image ID in addition to the value of the generated image counter. If the input image ID indicates that the target image file is the last file, even though the value of the generated image counter has not reached the maximum number (i.e., even if the current value of the generated image counter remains either 0 or 1 in this example), the CPU 11 does not endlessly repeat the process S106-S109 but determines in S109 that one screenful of thumbnail images has been generated.

When one screenful of thumbnail images is determined to have been generated (S109: YES), in S110 the CPU 11 displays the thumbnail image(s) stored in the LCD image storage area 40 on the LCD unit 16, and subsequently advances to S111.

The CPU 11 also jumps to S111 after determining in S105 that the page no. was not updated by the user (S105: NO).

In S111 the CPU 11 displays the cursor image C on the selection screen 20 at a position associated with the cursor position counter. As shown in FIGS. 3A and 3B, the cursor image C in the present embodiment is shown as a frame surrounding a thumbnail image displayed on the selection screen 20 in the LCD unit 16.

In S112 the CPU 11 receives data inputted from the input unit 17 when the user presses an operating key in the input unit 17.

In S113 the CPU 11 determines, based on the data inputted in S112, whether the pressed key was the OK key or another key, such as the Up key, Down key, Left key, or Right key.

If the CPU 11 determines in S113 that the pressed key was a key other than the OK key, in S114 the CPU 11 updates the page no. counter and/or the cursor position counter in accordance with the data inputted by the pressed key.

For example, when the pressed key was the Down key or Right key, the CPU 11 increments the cursor position counter by 1 in order to move the position of the cursor image C rightward one place. However, if the value of the cursor position counter exceeds the maximum value (2 in the present embodiment since the counter was initially set to 0) as a result of this increment, such as when the Down key or Right key was pressed when the cursor image C is in the rightmost position, the CPU 11 resets the cursor position counter to 0 and increments the page no. counter by 1. At this time, if the value of the page no. counter would exceed the maximum value (the page no. of the last page −1, since the counter is initially set to 0) as a result of this increment, i.e., when there is no next page, the CPU 11 maintains the page no. counter at the maximum value without incrementing the counter.

On the other hand, if either the Up key or Left key was pressed in S114, the CPU 11 decrements the cursor position counter by 1 in order to move the position of the cursor image C leftward one place. In this case, if the value of the cursor position counter would be less than 0 following this decrementing operation, such as when the Up key or Left key was pressed when the cursor image C was already in the leftmost position, the CPU 11 resets the cursor position counter to 0 and decrements the page no. counter by 1. At this time, if the value of the page no. counter would be less than 0 as a result of the decrementing operation, i.e., when no previous page exists, the CPU 11 maintains the value of the page no. counter at 0 without decrementing the counter.

The CPU 11 returns to S105 after finishing S114.

However, if the CPU 11 determines in S113 that the pressed key was the OK key, in S115 the CPU 11 sets the input image ID for an image file to be printed (print target) to the input image ID that is stored in the input image ID storage area 81 in association with a combination of the value of the display page no. storage area 82 that is equal to the current value of the page no. counter (page no.) and the value of the display image position number storage area 83 that is equal to the current value of the cursor position counter (display position).

In S116 the CPU 11 executes the output image generating process (the process (2) described above) on the image file having the input image ID set as the print target in S115. As a result of this process, output image data for the target image file (image data representing the print image) is generated and stored in the output image data storage area 33. Details of the output image generating process will be described later.

In S117 the CPU 11 executes a printing process on the output image data stored in the output image data storage area 33 and subsequently ends the current media image printing process. In the printing process, the CPU 11 copies one line worth of the output image data (pixel data generated as a result of the output image generating process and stored in the output image data storage area 33) to the print data storage area 37. The CPU 11 then performs color space conversion for converting the pixel data stored in the print data storage area 37 from RGB values to CMYK values, and also converts the pixel data to binary data for printing in each of the CMYK colors. The CPU 11 subsequently outputs the binary data to the printing unit 15 and the printing unit 15 performs a printing operation based on this binary data.

After the printing process has ended, the CPU 11 terminates the current media image printing process.

Next, the output image generating process (process (2) described above) executed in S107 and S116 of the media image printing process will be described with reference to a flowchart in FIG. 10. The output image generating process is configured to be executed in S107 on the image file whose ID has been set in S106 to be displayed on the selection screen 20, while to be performed in S116 on the image file whose ID has been set in S115 as a target for printing.

In S201 at the beginning of the output image generating process, the CPU 11 determines the type of the target image file by referencing the header data therein. Specifically, the CPU 11 refers to the filename stored in the input image filename storage area 52 in association with the input image ID of the target image file in the input image information storage area 31. By using the filename, the CPU 11 directly accesses the target image file stored on the media card and refers to the header data therein.

In S202 the CPU 11 determines whether the type of image file determined in S201 is classified as a still image file or a motion image file.

If the CPU 11 determines in S202 that the image file is a motion image file, then in S203 the CPU 11 executes a process to analyze the motion image file. Through this analytical process, the CPU 11 acquires format type data and codec type data for the motion image file. The CPU 11 stores these data respectively in the format type storage area 61 and codec type storage area 62 of the motion image information storage area 32 (see FIG. 5).

In S204, the CPU 11 calculates frame nos. for nine frame images that will be extracted from the motion image file, i.e., the CPU 11 identifies nine frame nos. to be extracted from all the frame images constituting the motion image file. Specifically, the nine frame images are extracted such that the following frame images are included: the first frame image; the last frame image; and seven frame images distributed equally therebetween, the seven frame images being derived by dividing the total number of frames in the motion image file in eight equal intervals.

In S205 the CPU 11 executes a process to extract motion image parameters from the motion image file. Through this extraction process, the CPU 11 acquires horizontal size data, vertical size data, total frame number data and the FPS data for the motion image file; and the frame no., offset size and data size before expansion for each of the nine frame images to be extracted. The CPU 11 stores these data in the motion image information storage area 32 and the frame image information storage area 35. More specifically, the CPU 11 stores the horizontal size data, the vertical size data, the total frame number data and the FPS data respectively in the horizontal size storage area 63, the vertical size storage area 64, the total frame number storage area 65, and the FPS data storage area 66 of the motion image information storage area 32, while storing the frame nos., the offset sizes and the data sizes before expansion respectively in the frame no. storage area 74, the offset size data storage area 72 and the frame size data storage area 73 of the frame image information storage area 35. If data for a different motion image file has already been stored in the motion image information storage area 32 and the frame image information storage area 35 at this time, the CPU 11 first deletes the existing data before storing the data for the motion image file currently being processed (overwrites the existing data). In the frame image information storage area 35, the CPU 11 stores data for the nine frame images in the nine sub-regions respectively in association with the respective layout position nos. stored in frame layout position no. storage area 71 (refer to FIGS. 2 and 6).

In S206 the CPU 11 determines how many frame images should be extracted from the target motion image file as candidates for the parameter calculation frame images (the candidate frame number) based on the FPS data stored in the FPS data storage area 66. In the present embodiment, the candidate frame number is configured to increase as the value of the FPS data increases (i.e., the more frame images the motion image file has to be played back in one second, the more frame images are extracted to calculate adjustment parameters therefrom). More specifically, in the present embodiment, a plurality of candidate frame numbers are predetermined in accordance with a plurality of different FPS values. For example, the candidate frame number "5" is predetermined for the FPS value of 30, and the candidate frame number "3" is predetermined for the FPS value of 15. However, as a variation, the candidate frame number may be calculated as a value equal to a prescribed percentage (one sixth, for example) of the FPS value of the target motion image file. The CPU 11 stores the candidate frame number determined in S206 in the candidate frame number storage area 91 of the adjustment parameter calculation information storage area 42.

Subsequently, from S207 to S213, the CPU 11 executes a process during which frame image data representing the frame images to be laid out in the layout image are adjusted and subsequently laid out sequentially in the output image data storage area 33. Specifically, the CPU 11 sequentially reads a frame image to be laid out (as a target for adjustment), calculates adjustment parameters (total adjustment parameters) for the read frame image, performs adjustments on the frame image using the calculated adjustment parameters (total adjustment parameters), lays out and stores the adjusted frame image data in the output image data storage area 33 in S207-S213. The CPU 11 repeats the above process until there remains no more frame image to be laid out.

In S207, the CPU 11 reads, from the target motion image file, data of a frame image to be adjusted from among the nine frame images ($0^{th}$ through $8^{th}$ frames) based on the offset size stored in the offset size data storage area 72 and the data size (before expansion) stored in the frame size data storage area 73. More specifically, the processed frame image counter prestored in the temporary variable storage area 38 is given an initial value of 0. The CPU 11 targets the frame image data whose layout position no. stored in the frame layout position no. storage area 71 corresponds to the current value of the processed frame image counter.

In S208, the CPU 11 stores the frame image data read in S207 (before expansion) in the frame image data storage area 36.

In S209, the CPU 11 executes the image adjustment parameter calculating process (process (3) described above). Throughout this process, the CPU 11 calculates the total adjustment parameters (more specifically, an upper limit average and a lower limit average), which will be used later in an image adjustment process (a well-known histogram adjustment) in S211, and stores the same in the total adjustment parameter storage area 43. Details of the image adjustment parameter calculating process will be described later with reference to FIG. 11.

In S210, the CPU 11 executes an expansion (decoding) process on the frame image data stored in the frame image data storage area 36 and coverts this data to a format in which pixel calculations are possible (such as image data expressing RGB values for each pixel as numerical values from 0 to 255).

In S211, the CPU 11 executes the image adjustment process (histogram adjustment) using the total adjustment parameters stored in the total adjustment parameter storage area 43. Specifically, the CPU 11 first generates a look-up table to be used for the histogram adjustment. Among all the 256 different values of 0-255 which each pixel value will possibly possess, the CPU 11 assigns values smaller than or equal to the lower limit average with 0, while assigning values higher than or equal to the upper limit average with 255. The CPU 11 then divides the pixel value range between the upper and lower limit averages in 255 equal intervals. The look-up table generated in this way shows a relationship between each pixel value of 0-255 that possibly exists in the target frame image and a convertible pixel value at which each pixel value in the target frame image should be converted. The CPU 11 then converts the pixel values of the frame image data decoded in S210 by referring to the generated look-up table.

In S212, the CPU 11 lays out and stores the frame image data adjusted in S211 (the pixel data after decoded) at a layout position (0 to 8) in the output image data storage area 33. At this time, the target frame image data is stored at the layout position whose layout position no. corresponds to the current value of the processed frame image counter.

In S213, the CPU 11 determines whether all the frame image data have been laid out in the output image data storage area 33. Specifically, the CPU 11 increments the processed frame image counter by 1 each time the processes of S207-S212 for one frame image is completed. The CPU 11 determines in S213 that all the frame images have been laid out when the value of the processed frame image counter reaches the number of frame images to be laid out (i.e., nine in the present embodiment).

The CPU 11 returns to S207 when determining in S213 that all the frame images have not yet been laid out (S213: NO) and performs the above processes S207-S213 on data for one of the unprocessed frame images.

However, if the CPU 11 determines in S213 that all the frame images have been laid out (S213: YES), the CPU 11 ends the current output image generating process. At this time, the image data stored in the output image data storage area 33 (pixel data representing a layout image in which nine frame images are laid out) is the output image data for the target motion image file.

On the other hand, if the CPU 11 determines in S202 that the target image file is a still image file, then in S214 the CPU 11 performs an expansion (decoding) process on the still image file to convert the image data in the still image file to a format in which pixel calculations are possible.

In S215 the CPU 11 stores the image data expanded in S214 in the output image data storage area 33, and subsequently ends the current output image generating process. In other words, for still image files, unlike motion image files, a single still image is laid out in the output image data storage area 33. At this time, the image data stored in the output image data storage area 33 (pixel data representing a still image) is the output image data for the still image file.

Next, the image adjustment parameter calculating process (process (3) described above) executed in S209 of the output image generating process will be described with reference to a flowchart in FIG. 11.

In S301 at the beginning of the image adjustment parameter calculating process, the CPU 11 determines the frame nos. of frame images that are candidates for the parameter calculation frame image (i.e., the target frame image and the neighboring frame images of the target frame image that will be possibly used for calculating total adjustment parameters). Specifically, the CPU 11 first stores a frame no. of the target frame image (one of the nine frame image nos. stored in the frame no. storage area 74) in one of the sub-regions of the parameter calculation frame no. storage area 93 that corresponds to the parameter calculation frame ID no. 0 of the parameter calculation frame ID storage area 92. The CPU 11 then designates, as candidates for the parameter calculation frame images, neighboring frame images that are chronologically before and after the target frame image. More specifically, the neighboring frame images are selected in such an order that from one that is chronologically closest to the target frame image toward another that is positioned further from the target frame image, as well as that those chronologically before the target frame image and those chronologically after the target frame image are alternated with one another. That is, a neighboring frame image immediately before the target frame image is selected to have the parameter calculation frame ID no. 1, another neighboring frame image immediately after the target frame image is given the parameter calculation frame ID no. 2, another neighboring frame image immediately before the one having the parameter calculation frame ID no. 1 is given the parameter calculation frame ID no. 3, and another neighboring frame image immediately after the one having the parameter calculation frame ID no. 2 is given the parameter calculation frame ID no. 4, and so forth. The neighboring frame images of the target frame image are selected in this way as candidate for the parameter calculation frame images until the total number of the target frame image and the selected neighboring frame images reaches the number stored in the candidate frame number storage area 91.

As an example, suppose that the frame no. 160 is stored in the frame number storage area 74 as the frame no. of the target frame image. In this case, as shown in FIG. 8, the CPU 11 stores 160 (frame no.) in the sub-region of the parameter calculation frame no. storage area 93 corresponding to parameter calculation frame ID no. 0 of the parameter calculation frame ID storage area 92. The frame image of frame no. 160 is in this way determined as a candidate for the parameter calculation frame image having an ID no. 0. Subsequently, four neighboring frame images of the target frame no. 160 (i.e., frame images whose frame nos. are 159, 161, 158 and 162) are identified and also stored in the sub-regions of the parameter calculation frame no. storage area 93 as candidates for the parameter calculation frame images having ID nos. 1, 2, 3 and 4 respectively. In this example shown in FIG. 8, since 5 is stored in the candidate frame number storage area 91 to indicate that five frame images should be extracted to calculate adjustment parameters, four frame images (precisely, the neighboring frame images of the target frame image which have ID nos. of 1 to 4) are determined as candidates for the parameter calculation frame images in addition to the target frame image that is given the ID no. 0.

In case that the first frame image or the last frame image is determined to be a parameter calculation frame image of ID no. 0, no frame image exists before the first frame image or after the last frame image. Such nonexistent frame images are configured to be skipped in the present embodiment. For example, suppose that the candidate frame number is 5, and the first frame (frame no. 0) is determined as the parameter calculation frame image having ID no. 0. In this case, frame no. 1 is assigned with ID no. 1, frame no. 2 with ID no. 2, frame no. 3 with ID no. 3, and frame no. 4 with ID no. 4.

Subsequently in S302, the CPU 11 extracts, from the target motion image file, frame image data corresponding to one of the candidates for the parameter calculation frame images (to be referred to as "candidate frame image data") designated in S301. Specifically, the calculation frame image counter is prestored in the temporary variable storage area 38 and is given an initial value 0. The CPU 11 extracts the candidate frame image data whose frame no. is stored in the parameter calculation frame no. storage area 93 in correspondence with the parameter calculation frame ID of the parameter calculation frame ID storage area 92 that is equal to the current value of the calculation frame image counter.

In S303 the CPU 11 stores the candidate frame image data that was extracted from the motion image file in S302 in the parameter calculation image data storage area 41.

In S304 the CPU 11 executes a process to analyze similarity between the candidate frame image data stored in the parameter calculation image data storage area 41 and the frame image data that was stored in the frame image data storage area 36 in S208 of the output image generating process as a target of adjustment (target for output). More specifically, the CPU 11 expands (decodes) both frame image data and calculates an absolute value of a difference between the pixel values in the two frame image data at each coordinates (each pixel position). The CPU 11 calculates the absolute values of the differences (difference absolute values) for all the coordinates in terms of R, G and B. The CPU 11 sums up the difference absolute values for all the coordinates and for all the colors of R, G and B to obtain a difference total value D indicative of a difference between the two frame images.

The CPU 11 determines in S305 whether there is correlation (similarity) between the two frame images by judging whether the difference total value D is smaller than a predetermined threshold value. In the present embodiment, the threshold value is set to a value of "pixel size of one frame image (total number of pixels in one frame image)×2." If the difference total value D is smaller than the threshold value, the CPU 11 determines in S305 that there is correlation between the candidate frame image data and the target frame image data.

If the CPU 11 determines that there is correlation between the two frame image data (S305: YES), in S306 the CPU 11 determines that the candidate frame image data is now allowed to become the parameter calculation frame image and calculates adjustment parameters (precisely, an upper limit pixel value and a lower limit pixel value) for the parameter calculation frame image stored in the parameter calculation image data storage area 41. More specifically, the CPU 11 first calculates frequency (the number of pixels) for each pixel value from 0 to 255 in terms of R, G and B respectively, and sums up the frequencies, for all the colors of R, G and B, to obtain a histogram that indicates the pixel appearing frequency for each pixel value of 0-255. The CPU 11 then sums up the frequencies in the histogram in descending order from the highest pixel value (255, 254, 253 . . . ) and designates, as the upper limit pixel value, a pixel value at which the sum first becomes greater than five percent of all the total pixel number in the histogram (i.e., pixel size of the frame image×3). Similarly, summing up all the frequencies (histograms) in ascending order from the lowest pixel value (0, 1, 2 . . . ), the CPU 11 designates a pixel value at which the sum first becomes greater than five percent of the total pixel number in the histogram as the lower limit pixel value.

In S307, the CPU 11 stores the adjustment parameters (the upper limit pixel value and the lower limit pixel value) calculated in S306 in a sub-region of the adjustment parameter storage area 96 corresponding to the parameter calculation frame ID that is equal to the current value of the calculation frame image counter. The CPU 11 then proceeds to S308.

On the other hand, upon determining in S305 that the difference total value D is greater than or equal to the threshold value, i.e., there is no correlation between the candidate frame image data and the target frame image data (S305: NO), the CPU 11 jumps to S308 by skipping the processes S306-S307. In other words, as for the neighboring frame image that is selected as a candidate for the parameter calculation frame image but is determined to have no similarity with the target frame image, adjustment parameters are not calculated. In this way, such dissimilar neighboring frame image (candidate frame data that is not selected as the parameter calculation frame image) is not considered in subsequent calculation of the total adjustment parameters.

Note that, in the present embodiment, the target frame image is selected as a candidate for the parameter calculation frame image just like the neighboring frame images in S301, and is always determined to be the parameter calculation frame image in S305 since the target frame image (as the candidate frame image) is determined to be similar (identical) to the target frame image (as target for adjustment). In this way, the target frame image is always considered in calculation of the total adjustment parameters.

In S308, the CPU 11 determines whether the processes from S302 to S307 have been performed for all the candidate frame images. Specifically, the CPU 11 increments the value of the calculation frame image counter by 1 each time the processes from S302 to S307 (including a NO determination in S305) have been executed on one candidate frame image data. The CPU 11 compares the current value of the calculation frame image counter with the candidate frame number (stored in the candidate frame number storage area 91) and determines whether the processes S302-S307 have been repeated for the number of times, the number being equal to the candidate frame number.

Upon determining in S308 that the value of the calculation frame image counter is smaller than the candidate frame number (five in the example of FIG. 8), in other words, when the processes S302-S307 have not yet been performed on all the candidate frame image data (S308: NO), the CPU 11 returns to S302 and executes the process S302-S307 for one of the remaining candidate frame image data.

When determining in S308 that the value of the calculation frame image counter reaches the candidate frame number, i.e., the processes S302-S307 have been performed for all the candidate frame image data (S308:YES), in S309 the CPU 11 calculates the total adjustment parameters (precisely, the upper limit average and the lower limit average) based on the adjustment parameters (the upper limit pixel values and the lower limit pixel values) obtained from all the parameter calculation frame images. Specifically, the CPU 11 calculates the total adjustment parameters by calculating weighted averages of the values stored in the adjustment parameter storage area 96 based on the difference total values D obtained in S304.

For example, suppose that there are five parameter calculation frame images IMG1 to IMG5, adjustment parameters for these parameter calculation frame images IMG1-IMG5 are P1-P5, and respective difference total values are D1-D5. In this case, the CPU 11 calculates the total adjustment parameters (TP) by using following equations (1) through (8).

$$TotalD = D1 + D2 + D3 + D4 + D5 \quad \text{equation (1)}$$

$$W1 = TotalD - D1 \quad \text{equation (2)}$$

$$W2 = TotalD - D2 \quad \text{equation (3)}$$

$$W3 = TotalD - D3 \quad \text{equation (4)}$$

$$W4 = TotalD - D4 \quad \text{equation (5)}$$

$$W5 = TotalD - D5 \quad \text{equation (6)}$$

$$TotalW = W1 + W2 + W3 + W4 + W5 \quad \text{equation (7)}$$

$$TP = P1 \times (W1/TotalW) + P2 \times (W2/TotalW) + P3 \times (W3/TotalW) + P4 \times (W4/TotalW) + P5 \times (W5/TotalW) \quad \text{equation (8)}$$

When the upper limit pixel values, which are calculated in S306 and stored in the adjustment parameter storage area 96, are substituted for the P1-P5 in the equation (8), the total adjustment parameter TP is obtained as the upper limit average. Similarly, when the lower limit pixel values, which are calculated in S306 and stored in the adjustment parameter storage area 96, are substituted for the P1-P5, the total adjustment parameter TP is obtained as the lower limit average.

In S310 the CPU 11 stores the total adjustment parameters calculated in S309 in the total adjustment parameter storage area 43, and subsequently terminates the image adjustment parameter calculating process.

As described above, in the MFP 10 according to the first embodiment, the adjustment parameters (total adjustment parameters) used for performing adjustments on each target frame image for output are calculated based not only on the target frame image, but also on a prescribed number of neighboring frame images that are extracted from the motion image file for the purpose of calculating the adjustment parameters (therefore not to be outputted).

In other words, the MFP 10 of the present embodiment calculates the adjustment parameters for adjusting each frame image (output target) in consideration of the frame images other than the output target. Specifically, in the present embodiment, the neighboring frame images that are chronologically continuous with the target frame images are selected as candidates for the parameter calculation frame images, since such neighboring frame images tend to have a high probability of similarity with the target frame image.

With this configuration, the MFP 10 of the present embodiment can mitigate adverse effects that noise contents contained in the target frame image would have on the calculation of the adjustment parameters, when compared to a configuration in which adjustment parameters are calculated based only on the target frame image. The existence of noise contents in frame images prevents adjustment parameters from being calculated appropriately. However, the present configuration can achieve appropriate adjustment parameters to be calculated even if the target frame image contains noise contents. Further, this configuration is effective in mitigating effects of noise contents not only when the target frame image has the noise contents therein, but also when the neighboring frame images other than the target frame image (the parameter calculation frame images) contain the noise contents, since respective frame images have noise contents that have different characteristics from one another. Hence, the noise contents can be made less conspicuous in the target frame image when outputted.

Even if the neighboring frame images are chronologically continuous with the target frame image, however, there is a possibility that such neighboring frame images do not have similarities with the target frame image due to switchover of scenes, for example. In this case, such dissimilar neighboring frame images should be desirably excluded from calculation of adjustment parameters images. Hence, the MFP 10 of the first embodiment is configured not to consider the neighboring frame images which have large differences from (not correlation with) the target frame image when calculating the total adjustment parameters. With this configuration, inappropriate frame images can be excluded from the calculation of the total adjustment parameters, thereby preventing degradation of the total adjustment parameters.

Further, normally, the closer the neighboring frame image is positioned chronologically to the target frame image, the higher the possibility is that the neighboring frame image is similar to the target frame image. Although the number of frames per unit of time can vary depending on the motion image files, there is a tendency that similarity between the neighboring frame images and the target frame image increases as the number of frames per unit of time is greater in a motion image file. Hence, the MFP 10 of the present embodiment increases the candidate frame number (the number of neighboring frame images extracted as candidates for the parameter calculation frame images) as the number of frames per unit of time increases. This configuration allows an appropriate number of neighboring frame images to be set as the candidate frame number in accordance with the number of frames per unit of time in each motion file.

Further, the MFP 10 of the first embodiment calculates the total adjustment parameters from the weighted averages of the adjustment parameters obtained from the parameter calculation frame images, the adjustment parameters being weighted based on the differences from the frame image to be outputted. Hence, the smaller the difference is between the target frame image and the parameter calculation frame image (the higher the similarity is), the more the parameter calculation frame image is considered for calculation of the total adjustment parameter. Hence, compared to a configuration in which all the parameter calculation frame images are equally considered (without taking account of the differences), the MFP 10 of the present embodiment can derive the total adjustment parameters more suitable to the target frame image.

Further in the present embodiment, the MFP 10 displays and prints, for a motion image file, a layout image in which nine frame images are laid out on a single page. Such frame images are chronologically discontinuous from one another (i.e., discretely exist) in the original motion image file unless the total number of frames in the motion image file is smaller than nine. Therefore, the adjustment parameters are desirably calculated for respective frame images (targets for adjustment) independently from one another, and should not be made common to all the frame images laid out in the layout image. Hence, the MFP 10 of the present embodiment calculates the adjustment parameters for each of the nine frame images to be adjusted (total adjustment parameters are calculated for respective nine frame images). Further, such total adjustment parameters are calculated, for each target frame image, not only based on the each target frame image, but also in consideration of the neighboring frame images of the each target frame image. This configuration also contributes to the mitigation of the adverse effects of the noise contents contained in the target frame images, leading to calculation of more suitable and appropriate adjustment parameters for respective target frame images.

Next, the MFP 10 according to a second embodiment will be described with reference to FIGS. 12 and 13. In the following description, explanations for basic configuration identical to that of the first embodiment are omitted and designated by the same reference numerals as those of the first embodiment for the sake of simplicity.

The MFP 10 according to the first embodiment is configured to calculate adjustment parameters based on the plurality of parameter calculation frame images extracted from the motion image file. The MFP 10 then calculates the total adjustment parameters by averaging the obtained adjustment parameters.

The MFP 10 according to the second embodiment, on the other hand, is configured to first generate an average image by averaging the plurality of parameter calculation frame images. The MFP 10 of the second embodiment then calculates the upper limit and the lower limit of the average image, and sets the upper and lower limits of the average image as the total adjustment parameters.

Specifically, the MFP 10 of the second embodiment does not use the adjustment parameter storage area 96 of the adjustment parameter calculation information storage area 42. In addition, a modified parameter calculation image data storage area 141 shown in FIG. 13 is used instead of the parameter calculation image storage area 41 of the first embodiment.

The parameter calculation image data storage area 141 of the second embodiment is provided with five sub-regions 141*a* as shown in FIG. 13, unlike the parameter calculation image data storage area 41 of the first embodiment having only one sub-region. Each sub-region 141*a* is for storing a parameter calculation frame image therein, meaning that the number of the sub-regions 141*a* changes so as to be consistent with the candidate frame number. In the example of FIG. 8, since the candidate frame number is 5, five sub-regions 141*a* (one for the target frame image 160 and four for the neighboring frame images 158, 159, 161 and 162) are prepared in the parameter calculation image data storage area 141. The parameter calculation image data storage area 141 is further provided with two more sub-regions: a temporary image storage area 141*b* and an average image storage area 141*c*. The temporary image storage area 141*b* is for temporarily storing decoded frame image data, and the average image storage area 141*c* is for storing the average image generated for calculating the total adjustment parameters. In other words, the parameter calculation image data storage area 141 has seven sub-regions for storing seven different frame image data.

Figure 11:
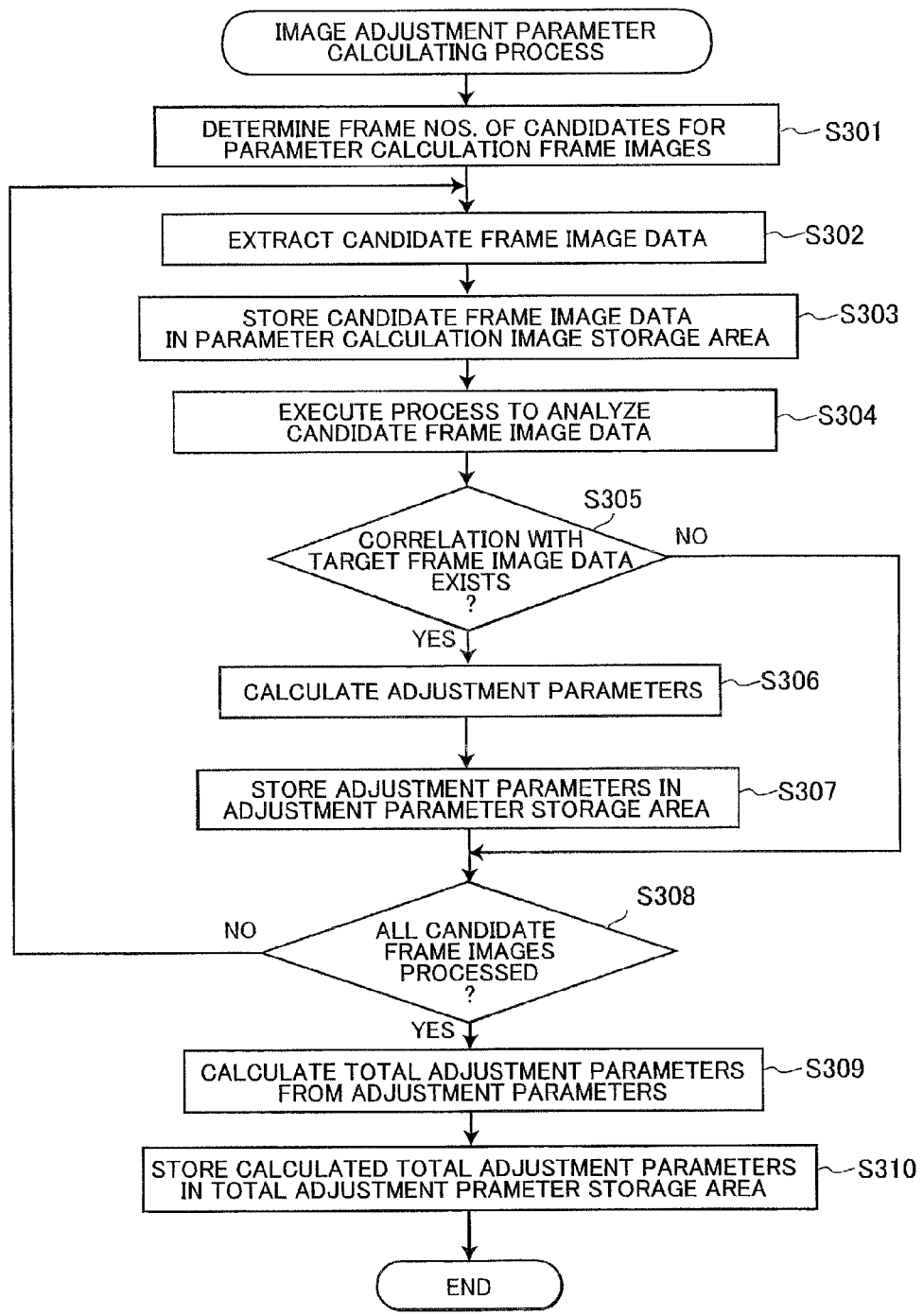
FIG. 11 is a flowchart of an image adjustment parameter calculating process executed by the CPU during the output image generating process of FIG. 10.

The MFP 10 (the CPU 11) of the second embodiment is configured to execute an image adjustment parameter calculating process shown in FIG. 12, instead of the image adjustment parameter calculating process shown in FIG. 11.

The image adjustment parameter calculating process according to the second embodiment will be described next with reference to the flowchart of FIG. 12. Since processes of S401, S402, S406, S408 and S412 in FIG. 12 are identical to the processes of S301, S302, S305, S308 and S310 of the image adjustment parameter calculating process according to the first embodiment in FIG. 11 respectively, explanations therefor are omitted.

In S403 the CPU 11 executes an expansion (decoding) process on frame image data corresponding to one of the candidates for the frame image parameter calculation frame images (candidate frame image data) extracted in S402.

In S404 the CPU 11 stores the candidate frame image data decoded in S403 in the temporary image storage area 141*b* of the parameter calculation image data storage area 141.

In S405, the CPU 11 executes a process to analyze similarity between the candidate frame image data stored in the temporary image storage area 141*b* (in the expanded state) and the frame image data (output target) that has been stored in the frame image data storage area 36 as a result of S208 of the output image generating process. Specifically, the CPU 11 decodes the frame image data stored in the frame image data storage area 36. Then in the same manner as in S304, the CPU 11 calculates, for each coordinate, a difference absolute value between pixel values of the frame image data and the candidate frame image data. The CPU 11 calculates the difference absolute values for all the coordinates in terms of R, G and B. Summing up the difference absolute values for all the coordinates for all of the colors of R, G and B to obtain a difference total value D (a difference between the two frame image data), the CPU 11 determines in S406 whether there is correlation (similarity) between the two frame image data based on whether the difference total value D is smaller than a predetermined threshold value. Also, in the second embodiment, this threshold value is set to a value of "pixel size of the frame image×2."

When the candidate frame image is determined as one of the parameter calculation frame images as a result of the affirmative determination in S406, in S407 the CPU 11 stores the candidate frame image data that has been stored in the temporary image storage area 141*b* in one of the five sub-regions 141*a* of the parameter calculation image data storage area 141. Specifically, the five sub-regions 141*a* are sequentially assigned with the numbers 0, 1, 2, 3 and 4 respectively in association with the ID nos. of the parameter calculation frame ID storage area 92. In S407 the CPU 11 stores the candidate frame image data, which has been stored in the temporary image storage area 141*b* and has now been determined as one of the parameter calculation frame images, in one of the sub-regions 141*a* that is assigned with the number corresponding to the current value of the calculation frame image counter. In this way, among all the candidate frame images, those determined to have similarity with the target frame image are stored in the sub-regions 141a of the parameter calculation image storage area 141 as the parameter calculation frame images.

In S409 the CPU 11 generates an average image from all the parameter calculation frame images stored in the sub-regions 141a of the parameter calculation image data storage area 141 in the course of repeating the loop of S402-408. More specifically, the CPU 11 calculates the average image by using weighted averages of the pixel values of the parameter calculation frame images in accordance with the difference total values D of the parameter calculation images obtained in S405.

For example, suppose that there are five parameter calculation frame images IMG1 through IMG5 which have pixel values of I1(x, y) through I5(x, y) and the difference total values of D1 through D5 respectively. Upon generation of the average image, the CPU 11 calculates each pixel value TI(x, y) for the average image based on the following equation (9) in addition to the seven equations (1) through (7) described above. Here, x and y indicate x coordinate and y coordinate respectively.

$$TI(x,y)=I1(x,y)\times(W1/TotalW)+I2(x,y)\times(W2/TotalW)+I3(x,y)\times(W3/TotalW)+I4(x,y)\times(W4/TotalW)+I5(x,y)\times(W5/TotalW)$$ equation (9)

In S410 the CPU 11 stores the average image generated in S409 in the average image storage area 141c of the parameter calculation image data storage area 141.

In S411 the CPU 11 calculates the total adjustment parameters (an upper limit pixel value and a lower limit pixel value in the histogram of the pixel values in the average image) based on the average image stored in the average image storage area 141c. The calculation method is the same as the calculation method executed in S306 of FIG. 11 for the parameter calculation frame images.

The MFP 10 according to the second embodiment having the above-described configuration can achieve technical effects the same as those of the first embodiment.

While the invention has been described in detail with reference to the embodiments thereof, it would be apparent to those skilled in the art that various changes and modifications may be made therein without departing from the spirit of the invention.

For example, in the above embodiments, all the neighboring frame images are chronologically and directly continuous with the target frame image. Instead, the prescribed number of neighboring frame images may be chronologically continuous with the target frame image as a whole, but not necessarily be directly continuous with the target frame image. Taking the case of FIG. 8 as an example, since the frame no. of the target frame image is 160, four frame images having frame nos. 150, 155, 165 and 170 may be extracted as the neighboring frame images of the target frame image, instead of the four frame images having frame nos. 158, 159, 161 and 162. The neighboring frame images of frame nos. 150, 155, 165 and 170 are not directly continuous with the target frame image of frame no. 160, but all these neighboring frame images can be said, overall, to be chronologically continuous with the target frame image.

The MFP 10 of the first and second embodiments employs, as an average value, a weighted average in calculating the total adjustment parameters. However, an arithmetic average may be used instead.

Further, although the MFP 10 of the above embodiments adopts histogram adjustments as a method for adjusting images, white balance adjustments may also be employed.

Further, the MFP 10 according to the above-described embodiments automatically identifies nine frame images to be extracted from a motion image file, but the present invention is not limited to this configuration. For example, the MFP 10 may prompt the user to select which frame images are to be extracted. Further, the number of frame images to be extracted from a motion image file is not limited to nine and need not be fixed to any specific number. The user may be prompted to specify the number of frame images to be extracted.

Further, in the first and second embodiments, the sum of the difference absolute values between the pixel values of the two frame images is used as the difference total value D indicative of the differences. However, the present invention may also employ other 'difference' in calculating the adjustment parameters. For example, 'size of motion vector' between frame images may be calculated by a well-known optical flow method and may be used to determine the difference between the frame images.

Further, the present invention has been applied to a multifunctional peripheral as an example of output devices according to the present embodiment, but the present invention may also be applied to a printing device other than a multifunctional peripheral, such as a printer without scanning function. Also, the present invention may be applied to a device that does not print images, such as an image displaying device. The present invention may be applicable to any types of output devices that output images.

Further, in the present embodiment, the MFP 10 outputs (transmits) the adjusted output images in a form of data to an internal unit (the printing unit 15), which finally outputs the adjusted output images in a form of printed material. However, the adjusted output images may be outputted (transmitted) to an external device in a form of data. The external device may perform various processes on the data of the adjusted output images. For example, the external device may display and/or print the adjusted output images.

Further, the present invention may also be applied to a computer connectable with an output device. If the output device is a printer, for example, a driver program for controlling operations of the connected printer is installed on a ROM, an HDD or the like in the computer. The driver program may be originally stored on a recording medium, such as a CD-ROM, and installed on the computer. By executing the driver program, the computer performs the above-described processes (1) to (3), just like the MFP 10. That is, the computer reads image files (motion image files and still image files) from a media card inserted in the computer, generates output images for each image file, adjusts the output images, displays thumbnail images corresponding to the adjusted output images on a display unit of the computer for selection, and controls the printer to print an output image corresponding to the thumbnail image selected by a user. If the output device is a display device, for example, when the driver program is executed, the computer may either display thumbnail images for selection on the display unit of the computer or control the display device to display the same on the display device, and then control the display device to display the output image corresponding to the thumbnail image selected by a user.

What is claimed is:

1. An output device comprising:
   an inputting unit that is configured to input an image file representing a motion image;
   an extracting unit that is configured to extract, from the image file, a first frame image and at least one neighboring frame image that is chronologically continuous with the first frame image;

a setting unit that is configured to set a number of neighboring frame images to be extracted from the image file based on a number of frame images per unit of time in the image file, the number of neighboring frame images being set to increase as the image file has more frame images per unit of time, the extracting unit extracting the at least one neighboring frame image of the number set by the setting unit from the image file;

a calculating unit that is configured to calculate a total adjustment parameter for adjusting the first frame image based on the first frame image and the at least one neighboring frame image;

an adjusting unit that is configured to adjust the first frame image using the total adjustment parameter to generate a first adjusted output image; and an outputting unit that is configured to output the first adjusted output image.

2. The output device according to claim 1, wherein the calculating unit is configured to determine at least one parameter calculation frame image, the parameter calculation frame image being the first frame image and the at least one neighboring frame image whose difference from the first frame image is smaller than a predetermined threshold value, the calculating unit calculating the total adjustment parameter based on the parameter calculation frame image.

3. The output device according to claim 2, wherein the calculating unit prevents such a neighboring frame image whose difference from the first frame image is greater than or equal to the threshold value from being determined as the parameter calculation frame image.

4. The output device according to claim 2, wherein the calculating unit is configured to calculate an adjustment parameter based on each parameter calculation frame image, the calculating unit calculating the total adjustment parameter by averaging the calculated adjustment parameters.

5. The output device according to claim 4, wherein the calculating unit is configured to weight each adjustment parameter when averaging the adjustment parameters, the adjustment parameter being weighted greater as the corresponding parameter calculation frame image has a smaller difference from the first frame image.

6. The output device according to claim 2, wherein the calculating unit is configured to generate an average image by averaging the at least one parameter calculation frame image and to calculate the total adjustment parameter based on the average image.

7. The output device according to claim 6, wherein the calculating unit is configured to weight the parameter calculation frame image when generating the average image, the parameter calculation frame image being weighted greater as the corresponding parameter calculation frame image has a smaller difference from the first frame image.

8. The output device according to claim 1,
wherein the extracting unit is configured to extract a plurality of first frame images from the image file;
the calculating unit is configured to calculate the total adjustment parameter for each first frame image based on the each first frame image and the at least one neighboring frame image extracted for the each first frame image; the adjusting unit is configured to adjust each of the plurality of first frame images based on the corresponding total adjustment parameter to generate a plurality of first adjusted output images each representing one of the plurality of first adjusted frame images; and the output unit is configured to output a second output image in which the plurality of first adjusted output images are laid out.

9. The output device according to claim 8, wherein the plurality of first frame images are chronologically discontinuous from one another.

10. An output device comprising:
an inputting unit configured to input an image file representing a motion image;
a processor configured to:
extract, from the image file, a first frame image and at least one neighboring frame image that is chronologically continuous with the first frame image;
set a number of neighboring frame images to be extracted from the image file based on a number of frame images per unit of time in the image file, the number of neighboring frame images being set to increase as the image file has more frame images per unit of time, the processor extracting the at least one neighboring frame image of the number set from the image file;
calculate a total adjustment parameter for adjusting the first frame image based on the first frame image and the at least one neighboring frame image; and
adjust the first frame image using the total adjustment parameter to generate a first adjusted output image; and
an outputting unit configured to output the first adjusted output image.

11. A non-transitory storage medium storing a set of program instructions executable on an output device, the set of program instructions comprising:
inputting an image file representing a motion image;
extracting, from the image file, a first frame image and at least one neighboring frame image that is chronologically continuous with the first frame image;
setting a number of neighboring frame images to be extracted from the image file based on a number of frame images per unit of time in the image file, the number of neighboring frame images being set to increase as the image file has more frame images per unit of time, where the at least one neighboring frame image of the number set are extracted from the image file;
calculating a total adjustment parameter for adjusting the first frame image based on the first frame image and the at least one neighboring frame image;
adjusting the first frame image using the total adjustment parameter to generate a first adjusted output image; and
outputting the first adjusted output image.

12. The non-transitory storage medium according to claim 11, wherein the outputting comprises outputting the first adjusted output image to an external device in a form of data.

13. The non-transitory storage medium according to claim 11, the outputting comprises printing the first adjusted output image.

14. The non-transitory storage medium according to claim 11, wherein the outputting comprises displaying the first adjusted output image.

15. An output device comprising:
an inputting unit configured to input an image file representing a motion image;
an extracting unit configured to extract, from the image file, a plurality of first frame images and neighboring frame images for each of the first frame images, the neighboring frame images being chronologically continuous with each of the first frame images, respectively;

a calculating unit configured to calculate a total adjustment parameter for each of the plurality of first frame images, respectively, each total adjustment parameter being calculated based on a weighted average of an adjustment parameter calculated for each of at least a sub-set of neighboring frame images of the respective first frame image;

an adjustment unit configured to adjust each of the first frame images based on the respective total adjustment parameter to generate a plurality of first adjusted output images each representing one of the plurality of first frame images adjusted with the respective total adjustment parameter; and an outputting unit configured to output a second output image in which the plurality of first adjusted output images are laid out.

16. The output device according to claim 15, wherein the sub-set of neighboring frame images is determined based on a correlation of image data between the respective first frame image and a target neighboring frame image, wherein the target neighboring frame image is included in the sub-set of neighboring frame images when the correlation is less than a predetermined threshold value, and wherein the weighted average is calculated using only the sub-set of neighboring frame images.

17. The output device according to claim 16, wherein the correlation is based on an absolute value of a color difference between corresponding pixels in the respective first frame image and the target neighboring frame image.

18. The output device according to claim 15, wherein weights for the weighted average is determined for each of the at least a sub-set of neighboring frame images based on a correlation of image data between the respective first frame image and each of the at least a sub-set of neighboring frame images and a total correlation between the at least a sub-set of neighboring frame images and the respective first frame image, the total correlation being a sum of each of the respective correlations.

* * * * *